United States Patent [19]
Wang

[11] Patent Number: 5,936,699
[45] Date of Patent: Aug. 10, 1999

[54] ELASTIC TEMPLE CONNECTION DEVICE FOR AN EYEGLASS FRAME

[75] Inventor: Shr-Ren Wang, Tainan Hsien, Taiwan

[73] Assignee: Chiang Heng Trading Co., Ltd., Tainan, Taiwan

[21] Appl. No.: 09/081,216

[22] Filed: May 20, 1998

[51] Int. Cl.[6] .................. G02C 1/13; G02C 5/16
[52] U.S. Cl. .............. 351/41; 351/113; 351/118; 351/121
[58] Field of Search ................... 351/111, 114, 351/118, 119, 121, 113, 41

[56] References Cited

U.S. PATENT DOCUMENTS 5,592,242  1/1997  Ooie .......................................... 351/44

*Primary Examiner*—Huy Mai
*Attorney, Agent, or Firm*—Rosenberg, Klein & Bilker

[57] ABSTRACT

An elastic device for an eyeglasses frame is contained in a center deep opening of a center deep opening formed in each of two ends of a frame and pivotaly connected to a front end of each of two temples so that the temples may be automatically adjusted in its tightness relative to the frame. Then the frame may be worn by users having faces of different size. Further the shape of the temples may be alterable according to the configuration of a frame.

1 Claim, 4 Drawing Sheets

ELASTIC TEMPLE CONNECTION DEVICE FOR AN EYEGLASS FRAME

BACKGROUND OF THE INVENTION

This invention relates to an elastic device for an eyeglasses frame, particularly to one combined between an eyeglasses frame and a temple so that the frame can be applied to users having faces of different size.

A conventional eyeglasses, as shown in FIGS. 5 and 6, includes a frame 90 and two temples 91 elastically combined with the frame 90. Each temple 91 has a housing 92 formed at a front end, and the housing 92 has a hollow interior 921 and a hole 922 in a wall. Then in the housing 92 are orderly contained a pivot 93, a position cylinder 94 containing the pivot 93 and fitted in the housing 92, and a coil spring 95 fitting around a rear portion of a screw 96, which fits in the pivot 93 and extends in the housing 92. The position cylinder 94 has a projection 941 on a side facing the hole 922 of the housing 92 so as to engage the hole 922 to secure the housing 92 with the temple 91. Further, the pivot 93 has an outer end 931 extends out of the position cylinder 94 and the housing 92, connected pivotally with an end of the frame 90 so that the temples 91 may be elastically expanded to suit to users having faces of different size.

The elastic device used in the conventional eyeglasses has been in use for a quite while, becoming a little out of fashion, with its configuration monotonous with few alteration.

SUMMARY OF THE INVENTION

The main purpose of the invention is to offer an elastic device used between an eyeglasses frame and two temples so as to permit the shape of temples alterable according to the configuration of an eyeglasses frame.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
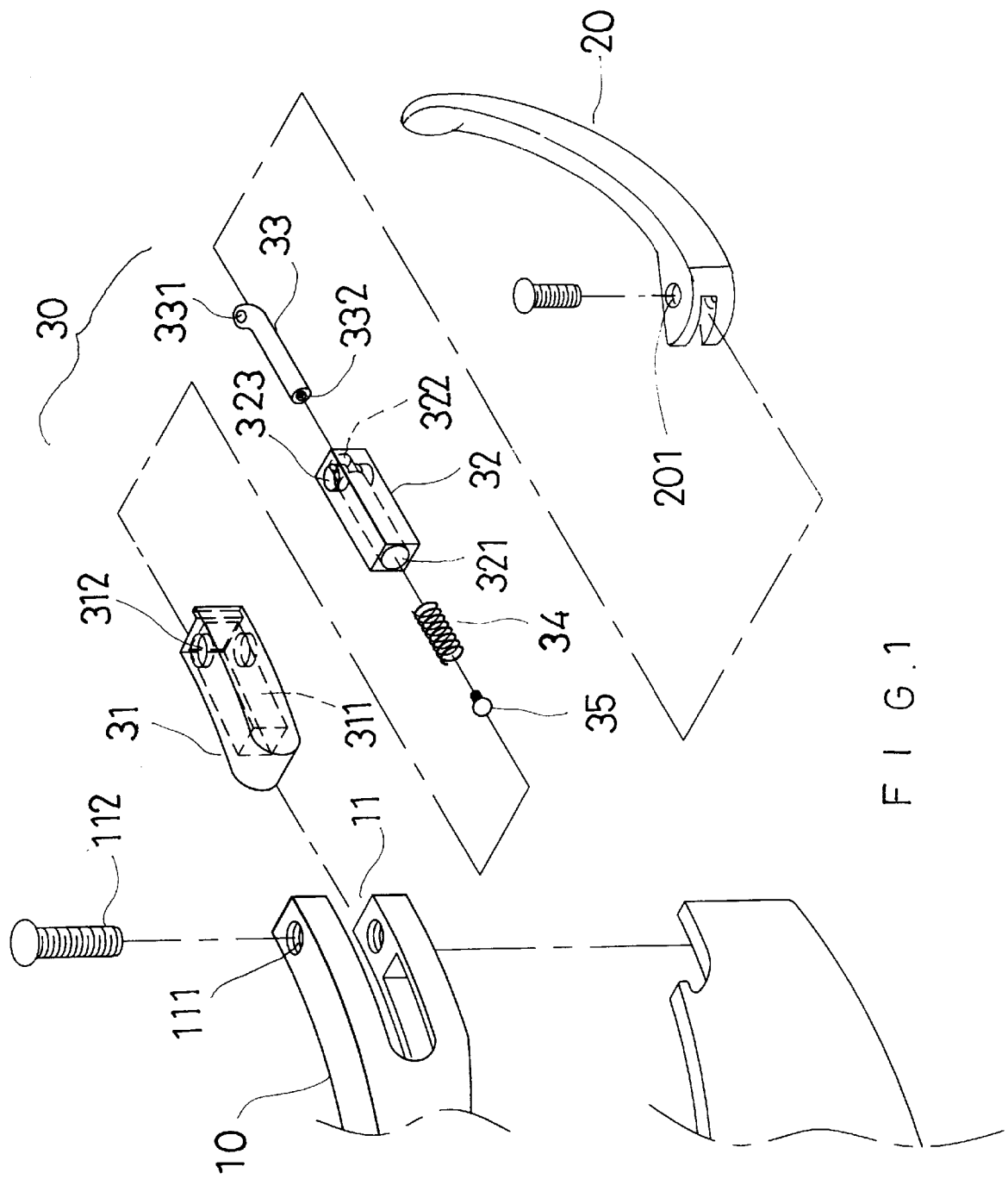
FIG. 1 is an exploded perspective view of an elastic device for an eyeglasses frame of the present invention.

A preferred embodiment of an elastic device for an eyeglasses frame in the present invention, includes an elastic device 30 interposed in each of two ends of a frame 10, and pivotally combined with each of two temples 20.

The frame 10 has a center deep opening 11 respectively formed in each of two ends, and a vertical hole 111 provided in each end for a screw 112, and each of the two elastic device 30 fitted in the center deep opening 11. Then a front end of each temple 20 is pivotally connected to the elastic device 30 with a screw.

The elastic device 30 includes a housing 31 provided with an rear open end and a front closed end, a hollow interior 311 and a hole 312 bored near the open end. The elastic device 30 further includes a position member 32, fitting in the hollow interior 311 of the housing 31, having a lengthwise through hole with a first opening 321 in a front end and a second opening 322 in a rear end, with the second opening 322 having a different diameter from that of the first opening 321. The position member 32 further has a vertical hole 323 for the screw 112 to pass through. Then a function tubular member 33, a spring 34 and a screw 35 are orderly contained in the through hole of said position member 32. The function member 33 has a vertical hole 331 in a rear end and a screw hole 332 in a front end. After the spring 34 is fitted around the function member 33, the screw 35 engages the screw hole 332 to limit the spring 34 within the position member 32.

Figure 2:
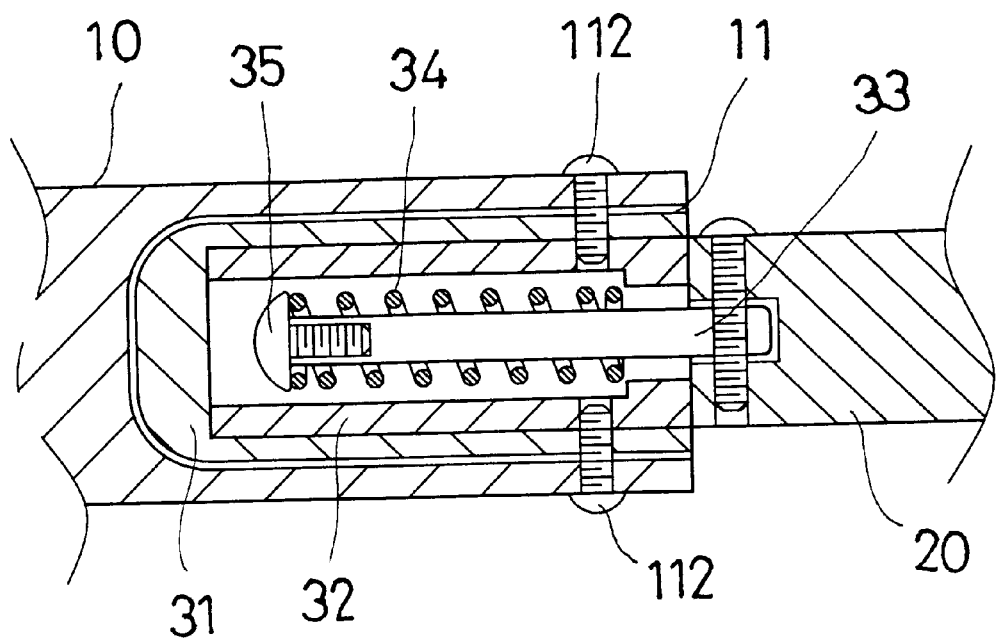
FIG. 2 is a cross-sectional view of the elastic device for an eyeglasses frame of the present invention.
Figure 3:
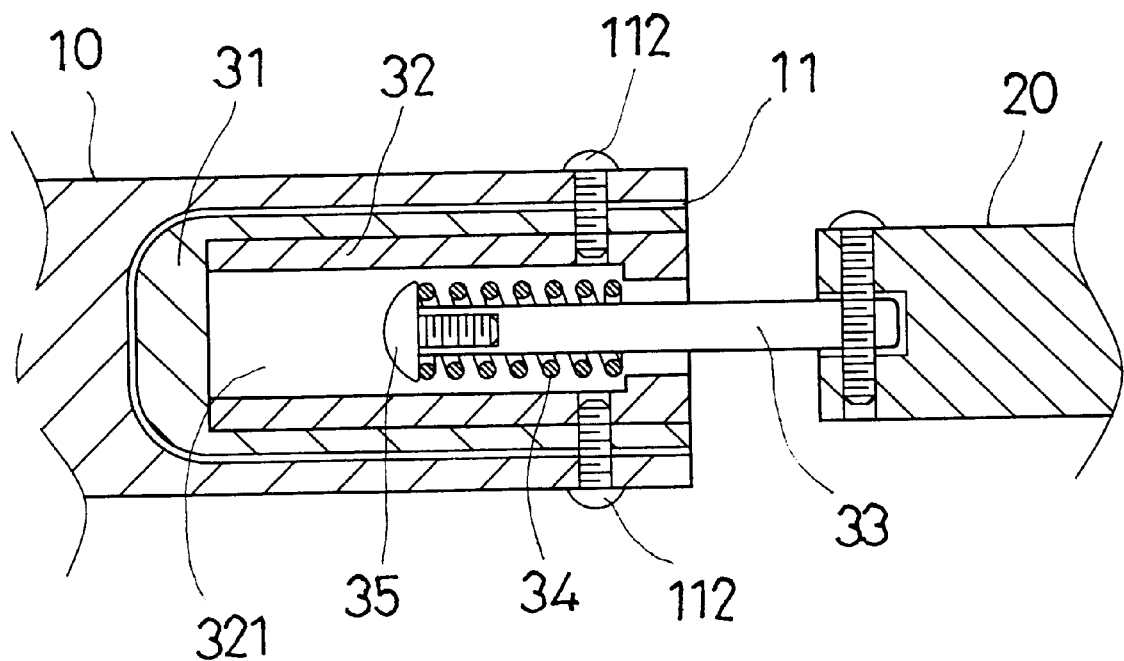
FIG. 3 is a cross-sectional view of the elastic device to permit a temple pulled out of the present invention.
Figure 4:
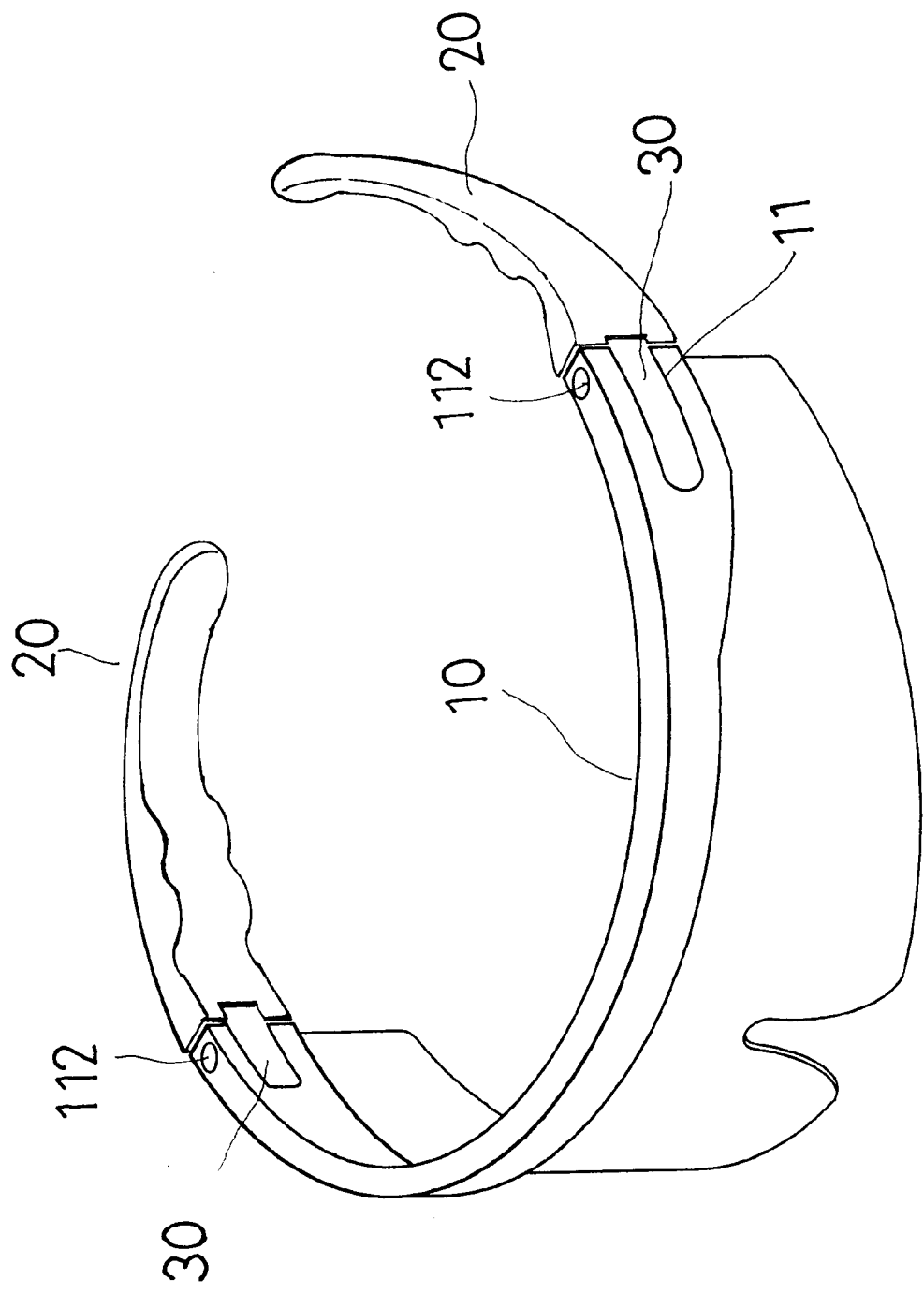
FIG. 4 is a perspective view of another eyeglasses frame provided with the elastic device of the present invention.
Figure 6:
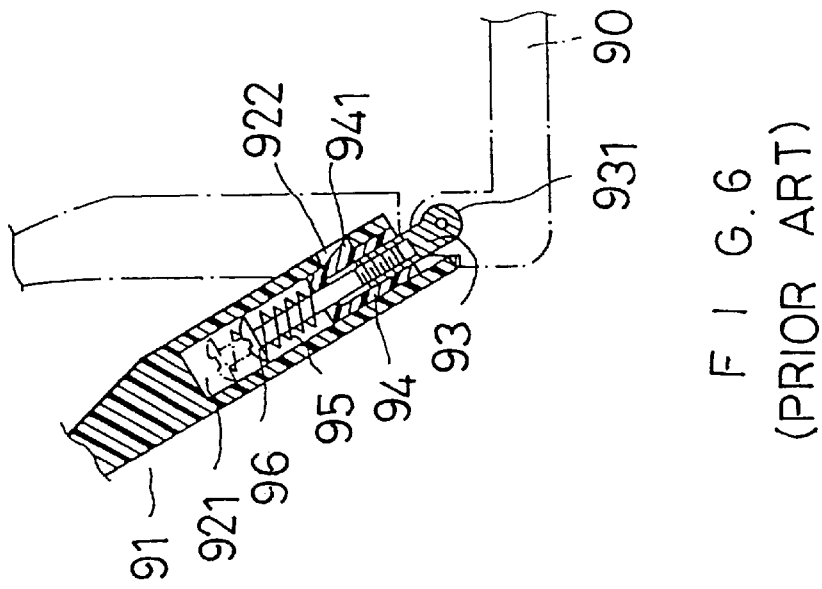
Figure 5:
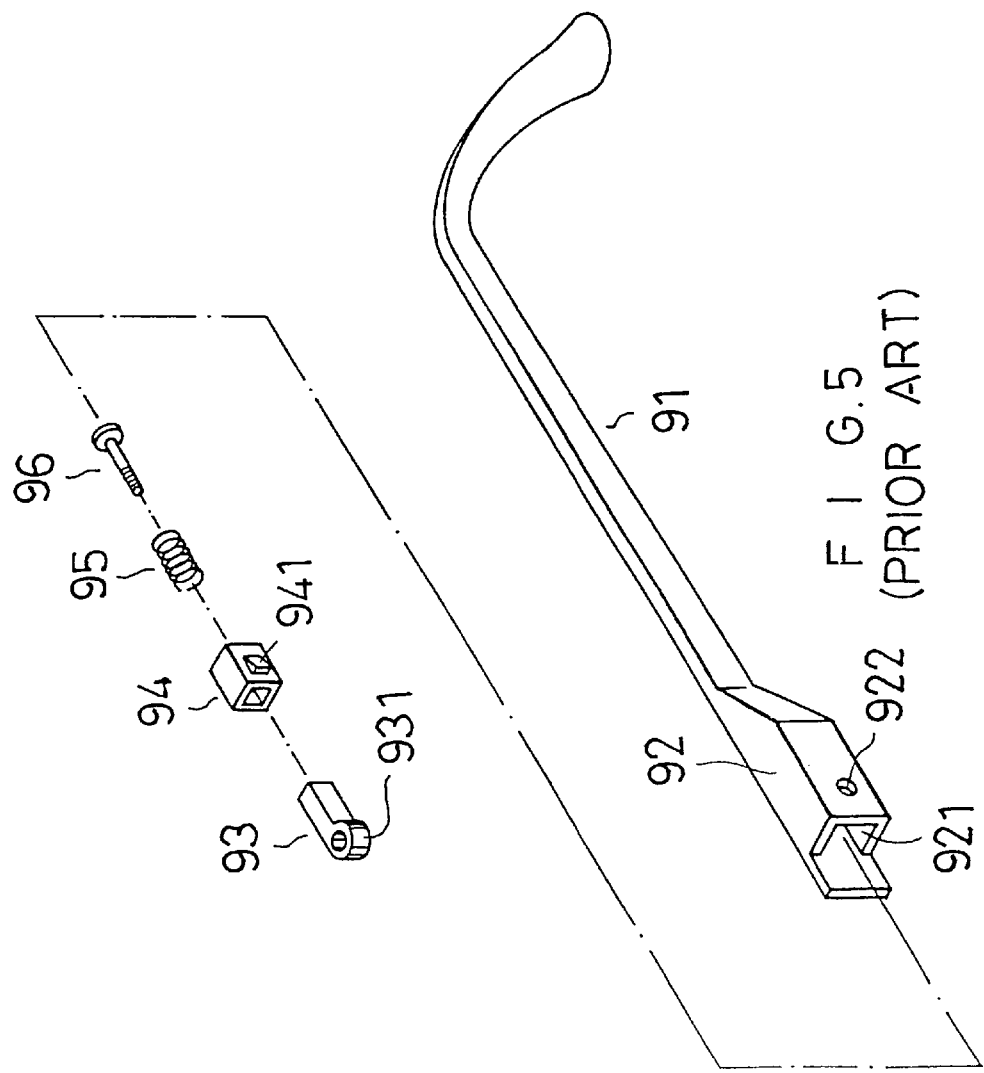
FIG. 5 is an exploded perspective view of a conventional elastic device for an eyeglasses frame; and, FIG. 6 is a cross-sectional view of the conventional elastic device for an eyeglasses frame.

In assembling, referring to FIG. 2, firstly, the position member 32, the function member 33, and the spring 34 are placed in the hollow interior 311 of the housing 31 and then the screw 35 is driven to engage the screw hole 332 of the function member 33. Then the elastic device 30 assembled is placed in the center deep opening 11 of the frame 10, with the screw 112 engaging the holes 111, 312, and 323 to secure the elastic device 30 with the frame 10. Then each temple 20 is combined with the elastic device 30 by means of a screw engaging the holes 201 of each temple 20 and at the same time the hole 323 of the position member 331 and the vertical hole 331 of the function member 33. Then the outer end of the function member 33 protrudes out of the center deep opening 111 of the frame 10 so that the function member 33 may move partly out of the through hole of the position member 32 to let the temple 20 expand for a certain distance.

Then tightness of the temples 20 against the frame 10 can be automatically adjusted by the elastic device 30, when the frame 10 is worn by users having faces of different size. In addition, the temples may be altered in configuration in accordance with that of the frame 10, enabling the temples made to have various configurations for users to choose.

While the preferred embodiment of the invention has been described above, it will be recognized and understood that various modifications may be made therein and the appended claims are intended to cover all such modifications which may fall within the spirit and scope of the invention.

What is claimed is:

1. An elastic connection device for coupling a pair of temples to an eyeglasses frame having an opening formed in each of a pair of opposing ends thereof, comprising a housing disposed within a respective one of said openings of said frame and having a rear open end and a front closed end to form an interior cavity, a position member located in said interior cavity of said housing and having a lengthwise through hole, a function member and a spring fitting around said function member contained movably in said lengthwise through hole of said position member, a screw engaging a threaded front end of said function member to limit said spring within said through hole of said position member and to permit said function member to move partly out of said lengthwise through hole of said position member, said function member having a vertical hole in an outer end for a screw to pivotally connect each said temple to said elastic device so that each said temple may be expanded in a certain distance to suit to users having faces of different size.

\* \* \* \* \*